United States Patent [19]

Nicosia

[11] 3,881,087

[45] Apr. 29, 1975

[54] TIP UNIT FOR AN ELECTRIC SOLDERING GUN

[75] Inventor: Joseph T. Nicosia, Kings Park, N.Y.

[73] Assignee: Gunmaster Industries Corporation, Mineola, N.Y.

[22] Filed: Feb. 22, 1973

[21] Appl. No.: 334,720

[52] U.S. Cl. ............... 219/233; 219/230; 219/239; 228/20; 228/54
[51] Int. Cl. ..................... H05b 1/00; B23k 3/02
[58] Field of Search ................... 219/221, 227–241; 228/19, 20, 51–55

[56] References Cited
UNITED STATES PATENTS

| 2,336,904 | 12/1943 | Ward | 219/221 |
| 2,397,348 | 3/1946 | Haines et al. | 219/235 |
| 2,780,712 | 2/1957 | Thomas | 219/230 X |
| 2,796,507 | 6/1957 | Young | 219/333 |
| 2,882,380 | 4/1959 | Campo | 219/230 UX |
| 3,050,512 | 8/1962 | Eversole | 219/233 |
| 3,172,382 | 3/1965 | Weglin | 219/227 X |
| 3,239,124 | 3/1966 | Hathcock | 228/20 |
| 3,316,384 | 4/1967 | Daniels | 228/19 X |
| 3,410,472 | 11/1968 | Weller et al. | 219/229 UX |
| 3,702,917 | 11/1972 | Christensen | 228/20 X |

FOREIGN PATENTS OR APPLICATIONS

| 787,065 | 6/1935 | France | 219/235 |
| 138,079 | 10/1947 | Australia | 219/233 |
| 585,796 | 11/1933 | Germany | 219/233 |

OTHER PUBLICATIONS

"Solder Melting Device," by Claude P. Bauman, RCA Technical Notes, RCA TN No: 462, September, 1961.

*Primary Examiner*—A Bartis
*Attorney, Agent, or Firm*—Darby & Darby

[57] ABSTRACT

A tip unit for an electric soldering gun includes a holder element formed from a single piece of electrical and heat conductive metal, such as aluminum, of substantially uniform thickness and having as integral and unitary parts thereof a pair of spaced arms joined together at one end thereof by an enlarged central section. The other end of each of the arms is adapted to be inserted into the terminals of a soldering gun. The central section is provided with a threaded bore for receiving the mating threaded portion of a soldering tip of copper or brass. The tip may be solid or provided with an internal bore extending the length thereof. In the latter case, a suction device can be connected to the rear end of the bore so that solder may drawn into the bore during a desoldering operation.

14 Claims, 8 Drawing Figures

PATENTED APR 29 1975  3,881,087
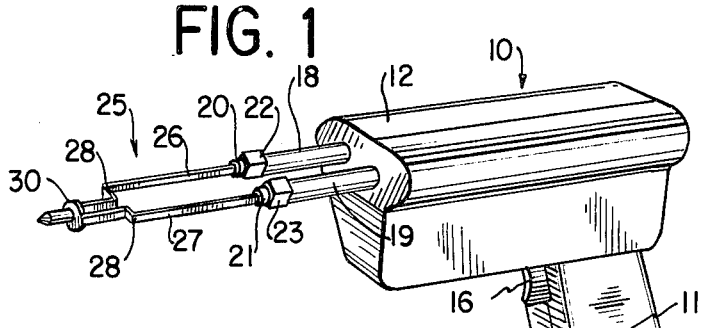
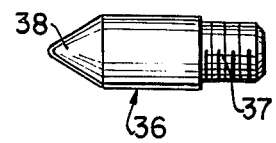
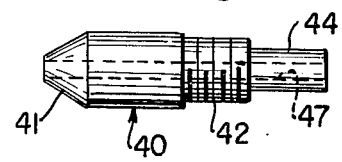
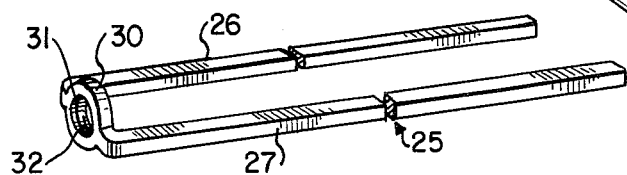
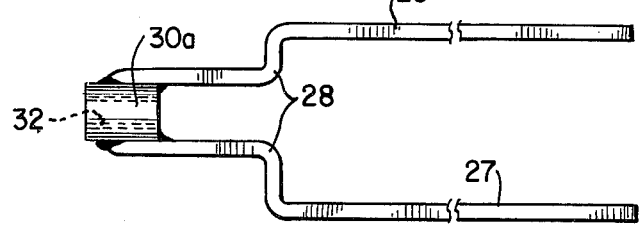
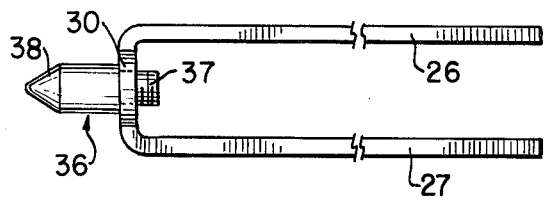
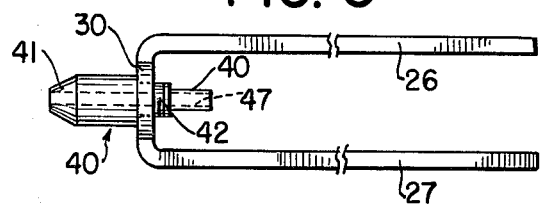
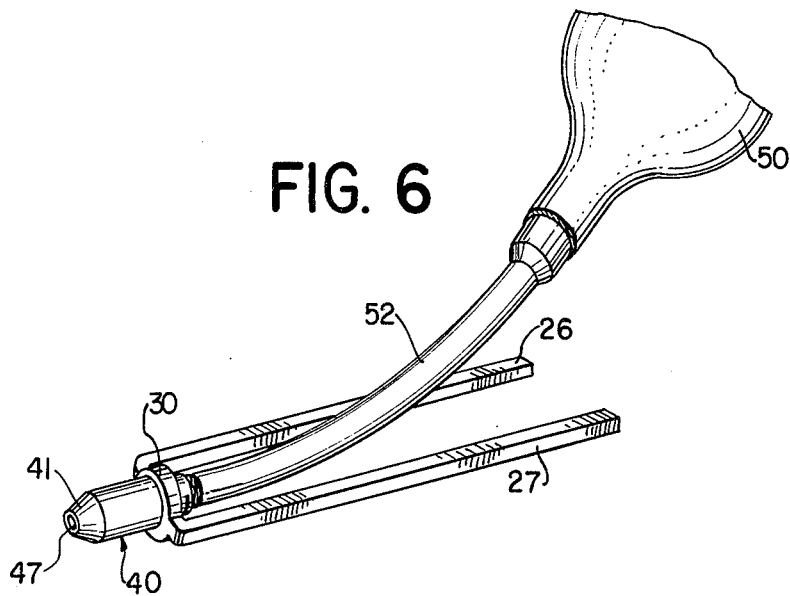

TIP UNIT FOR AN ELECTRIC SOLDERING GUN

Soldering guns for use in melting solder compositions to form electrical and other types of connections are well known in the art. The gun usually has a trigger switch which controls a transformer to provide one or more ranges of heating current to a soldering element. The soldering element is conventionally formed with two legs joined by a center bridging piece. Each of the legs is attached to a terminal on the gun to receive the heating current. The bridging portion of the element joining the two legs is used as the active, solder accepting member, normally called the tip, for applying heat to the area to be soldered and also for melting the solder.

In prior art soldering elements of the foregoing type, tip wear presents a problem. In a typical case the tip becomes so oxidized or corroded that it will no longer accept solder. In some cases, the corrosion, oxidation or tip wear is so great that the tip splits causing the two legs of the element to be disconnected and thereby rendering the element completely useless. In any event, it becomes necessary to completely replace the entire element with a new one even though the tip portion is the only part of the element that is actually worn. This, of course, is wasteful. In addition, the conventional soldering elements provide a relatively limited choice of tip sizes and shapes. Also, when a different tip size or shape is to be utilized, it is still necessary to change the entire element.

In U.S. Pat. No. 2,973,422 to Smith, a soldering iron is disclosed having two heat conductive arms and respective terminals for receiving the heating current. The ends of a loop of Nichrome wire are attached to the terminals and the center of the loop is formed with several turns which are wrapped around the tip to be heated. The arrangement of this patent is not efficient in the sense that the Nichrome wire is rather expensive, the arrangement of wrapping turns of wire around the tip is cumbersome, and the heat transfer between the wire and tip is not efficient.

In Nockunas U.S. Pat. No. 2,558,192 and the Anton U.S. Pat. No. 2,724,041, solder guns of the type under consideration are also disclosed and it is recognized that the bridging portion, or tip, of the solder element wears out rather quickly, rendering the entire element useless. In each of these patents, various tip shapes and/or auxiliary members are utilized to attempt to overcome the tip wear problem.

The present invention relates to a solder element for use with a conventional solder gun in which the element has two arms for attachment to the heating current output terminals of the gun. The portion of the element connecting the two arms is a holder which is itself threaded, or provided with some other suitable arrangement, for holding the actual solder tip. The tip is a separate element which is fastened to the holder and is heated. When the tip wears out, as a different shape or type of tip is to be used, the old tip need only be unthreaded from the holder and a new tip replaced. This arrangement saves the trouble and expense of replacing the entire element It is therefore an object of the present invention to provide a permanent type soldering element having a replaceable tip for use with an electric soldering gun.

Another object is provided a permanent type soldering element having a holder which can accept and hold different shapes and types of tips.

A further object is to provide a solder element for a solder gun which includes a holder bridging two arm portions of the element, the holder being threaded to permit ready replacement of the solder tip.

An additional object is to provide a novel tip for desoldering operations and an arrangement for holding the tip.

Other objects and advantages of the present invention will become more apparent upon reference to the following specification and annexed drawings, in which:

FIG. 1 is a perspective view showing a conventional soldering gun and the soldering element of the present invention;

FIG. 1A is an enlarged perspective view of the soldering element of FIG. 1;

FIG. 1B is a plan view of a modified form of soldering element;

FIGS. 2 and 3 are plan views showing various forms of soldering tips;

FIGS. 4 and 5 are fragmentary views of the soldering element of FIG. 1 with the tips of FIGS. 2 and 3, respectively, inserted;

FIG. 6 is a perspective view showing a solder sucking arrangement.

Referring to FIG. 1, a conventional soldering gun 10 is shown which can be of any suitable form. The gun 10 includes a handle 11 and a barrel 12. An electrical line cord 13 extends from the handle 11 and is connected within the gun to a transformer (not shown) typically located in barrel 12. The free end of cord 13 (not shown) is to be connected to an electrical outlet.

A trigger switch 16 is mounted on handle 11. The trigger switch controls the operation of the transformer. The trigger switch 16 can have one or more positions to control one or more ranges of heating current provided by the transformer.

Posts 18 and 19 extend from the barrel 12 and have respectively, electrically conductive terminals 20 and 21 mounted on their ends. The terminals 20 and 21 are connected to the transformer in the gun so that the heating current as controlled by the trigger switch 16 is supplied to the terminals.

The terminals 20 and 21 normally are threaded to accept the respective nuts 22 and 23. The terminals 20, 21 each have a cross hole to accept a respective end of an arm of the soldering element.

As heretofore described, the soldering gun is conventional. As also seen in FIG. 1, the soldering element 25 of the present invention has a pair of arms 26 and 27. The free end of each of the arms 26 and 27 is bent to fit within the cross-hole of the respective terminals 20 and 21 and is held therein by the nuts 22, 23. A holder 30 is located between the other ends of each of the arms.

In FIGS. 1 and 1A, the entire element 25 is stamped from a single piece of a suitable material, for example, aluminum. Aluminum does not accept the normally used tin-lead solder alloys. Therefore, it will not be adversely affected by the solder so it will be long wearing. In addition, aluminum is a relatively soft material so that the legs 26 and 27 can be bent to accommodate different forms of guns with different spacings for the terminals 20,21. In making the stamped element 25 of FIG. 1,1A, the holder 30 is relatively massive as compared to the arms. Therefore it will concentrate the heat and serve as a heat sink for the solder element to be placed in the holder.

The holder 30 has an internal through bore 31 which is threaded at 32, or otherwise provided with some suitable attachment to accept a solder tip. Typical solder tips are shown in FIGS. 2 and 3. The tip 36 of FIG. 2 is of solid construction and is of a material which will accept solder. Tip 36 has a rear end portion 37 which is threaded to mate with the threads 32 of the holder 30. The front end of the tip is of generally conical shape 38. It should be understood that the front end 38 can be of any suitable shape, for example, knife edge, chisel pointed etc.

FIG. 4 shows the tip 36 of FIG. 2 threaded into holder 30. The shoulder at the junction of the thread 37 and the body of the tip 36 rests against the front surface of the holder 30. When the solder gun is actuated, heating current flows through the two arms 26 and 27 heating the holder 30 and the tip 36 therein. As should be apparent, the holder 30 provides good heat transfer to the tip 36 in view of the intimate contact between the two elements and the mass of the holder.

In the event the tip 36 wears out, it is not necessary to remove the entire soldering element 25 and discard it. Instead, it is only necessary to unscrew the tip 36 and to insert a new tip. An old tip can be unthreaded by using a pair of pliers.

The holder 30 serves as an intermediate barrier between the tip 36 and the element arms 26 and 27. The attachment of the arms to the holder 30 is such that erosion by oxidation, which causes the arms to break apart in the prior art soldering elements, is virtually eliminated.

Referring now to FIGS. 3 and 5, a tip 40 is shown which also has a conical front end 41. As before, any other suitable shaped front end can be utilized. An intermediate portion of the body of tip 40 is threaded at 42 to mate with threads 32 of the holder 30. A reduced diameter stud 44 extends rearwardly from the body of the tip. A through bore 47 is provided through the entire length of the body 40. Bore 47 is of a suitable diameter to produce capillary action. The dimensions of the various portions of the tip 40 are such that when the tip is threaded to holder 30, as shown in FIG. 5, the shoulder between the end of the thread 42 and the body 40 rests against the front face of the holder 30 while the rear end of the stud 44 extends beyond the rear face of the holder.

The tip 40 of FIG. 3 is useful in a desoldering, solder removing, operation as well as in soldering. Soldering is carried out with the tip 40 in a conventional manner, that is, upon application of a heating current to the element 25, holder 30 is heated which in turn heats the tip 40 to melt the solder (not shown). As an additional feature, due to the presence of the bore 47, the bore can first be filled with solder before it is applied to the area at which the solder connection is to be made.

The bore 47 of the hollow tip 40 can be used to control the amount of solder deposited on a connection, or at a given area, by permitting a quantity of the wet solder deposited during the soldering operation to wick back up into the bore by capillary action.

During a de-soldering operation, the bore 47 provides a wicking area into which wet solder is drawn by capillary action. This is accomplished without any additional desoldering devices, such as a sucking syringe adjacent to the tip. This enable the tip, the connection being soldered and the immediate area to be free of encumbering auxiliary equipment. The capillary action of the bore of the hollow tip may be aided where necessary by first wetting it with paste or liquid-type soldering flux. It is preferred that the flux be non-corrosive.

In desoldering operations where the quantity of solder to be removed is greater that the bore 47 can readily accommodate at one time, the total amount of solder may be removed by repeated applications of the hollow tip. That is, successive amounts of the molten solder are sucked into the tip. Simple flicking of the entire gun by hand is all that is required to remove the hot solder from the bore 47 of the hollow tip after the gun is removed from the area of the connection.

FIG. 6 shows an embodiment of the invention wherein an auxiliary device is utilized to aid in removing large amounts of molten solder from a given area. Here, a bulb-type syringe 50 is provided with a heat-resistant flexible tube 52 having one end connected to the outlet of the bulb and the other to the rearwardly protruding stud 44 of the tip 40. The tube can be made of Teflon or other suitable heat resistant material. In operation, the tip 40 heats the solder to be removed and the molten solder is withdrawn by releasing the bulb which has previously been compressed.

In the arrangement of FIG. 6, the only connection between the syringe bulb 50 and the tip 40 is by means of the flexible tube 52. Thus, there is relatively little encumbering of the tip in its active area by the syringe. The arrangement of FIG. 6 permits the removal of large quantities of solder with less repeated applications of the tip to the area while still keeping the area of the solder connection clear.

The syringe bulb, in conjunction with the hollow tip 40, in the arrangement of FIG. 6 may be used to force hot solder into an enclosure or blind area. In this case, the tip 40 is first heated and the bore 47 is loaded with molten solder. The tip is placed in the area where the solder is to be applied and the bulb is then squeezed to eject the solder.

One or more wires of a connection can be placed directly into the bore 47 of the hollow tip 40 for soldering and de-soldering. This permits the formation of a good solder bond or more uniform removal of solder from the wire or wires.

The hollow tip, when used in the de-soldering mode, permits the de-soldering of components having multiple leads, such as transistors and integrated circuits, with ease and operator control hitherto unattainable with prior art soldering gun tips.

As indicated previously the tips to be used with holder 25 can be of any shape and size including tips which are relatively small in diameter as compared to the tips of conventional soldering elements for solder guns.

FIG. 1B shows another form of element 25 which also has a pair of arms 26 and 27 whose free ends are to be bent to fit within the cross-hole of the respective terminals 20 and 21. The other ends of each of the arms are bent at an intermediate point 28 to reduce the distance between the arms so that a holder 30a can be held therebetween as the bridging piece. The holder 30a is held between the two legs 26 and 27 by any suitable connection, for example, by welding or brazing, depending upon the materials of the legs and the holder. It should be understood that a braze of copper or brass, typical materials for the solder element and its holder 30a, has a higher melting temperature than the solder. The same holds true for a weld. The holder 30 is of relatively massive construction, as compared to the diameters of the material forming arms 26 and 27. Therefore, the heat produced at the holder will be concentrated. That is, the holder 30a, effectively serves as a heat sink. The holder 30a also has an internal through bore 31 which is threaded at 32, or otherwise provided with some suitable attachment to accept a solder tip. Any of the solder tips previously disclosed can be utilized with the holder of FIG. 1A.

As should be apparent, the soldering element 25, including the holder 30 or 30a can be made of any suitable material. For example, copper or brass may be utilized. If copper is utilized, the device, including the holder 30, may be electroplated or otherwise clad with a suitable protective material which does not accept solder. In the element of FIG. 1A, the legs and the holder can be made of different materials.

The tips of the invention may also be made of copper or brass. If made of copper, they also can be electroplated or otherwise coated or clad to accept solder and to improve tip life. Where a tip is formed with an internal bore, the bore is also preferably coated or clad with a suitable material which will accept solder.

As a further modification, the tip 40 can be coated or clad internally on bore 47 to accept solder, thereby making it useful as a de-soldering device, and made of or coated with a material to resist solder externally as particular soldering and de-soldering requirements may require.

As should be apparent, the device of the present invention has many advantages in that it provides a relatively permanent soldering element for an electric soldering gun in which only the tips need be replaced.

What is claimed is:

1. A solder tip holder element for an electrically operated soldering gun, said element formed from a single piece of electrical and heat conductive material of substantially uniform thickness and including as integral and unitary parts thereof a pair of spaced arms joined together at one end thereof by an enlarged central section as the only connecting piece, the other end of each of said arms adapted to be directly connected to a terminal of the soldering gun to receive current and to thereby pass current through and directly heat said central section, said central section having a bore, and thread means on the wall of the bore of said central section for detachably connecting and holding a solder tip while transferring heat thereto from the central section.

2. The solder element of claim 1 further comprising in combination therewith a solder tip having thread means thereon mating with the thread means on the central section of said element.

3. The combination of claim 2, wherein said solder tip has a solid body.

4. The combination of claim 2, wherein said solder tip is an elongated body and has an internal bore extending through the length of its body with both ends of said bore being exposed.

5. The combination of claim 4, further comprising gas supply means separate from said element, an elongated tube connected between said gas supply means and said solder tip to provide fluid communication between said gas supply means and one end of the bore of said tip to draw solder into the other end of the bore.

6. The combination of claim 5, wherein said gas supply means includes means for applying suction or gas under pressure to said bore of said tip.

7. The combination of claim 5, wherein said gas supply means comprises a compressible syringe type bulb.

8. The combination of claim 4, wehrein both the internal portion of the tip surrounding said tip bore and an external portion of the body accept solder.

9. The combination of claim 4, wherein the internal portion of the tip surrounding said tip bore is of a material which accepts solder and the external surface of the tip does not accept solder.

10. The combination of claim 4, wherein the bore of said central section of said holder extends therethrough, and said tip has respective first and second portions which extend from each side of said central section, the first portion adapted to apply heat to a given area.

11. In combination for an electrically operated soldering gun, a solder tip holder element, and a detachable solder tip for melting a solder, said element formed with a pair of spaced arms of electrically conductive metallic material, one end of each of said arms adapted to be connected to a terminal of the soldering gun to receive electric current, a solder tip holder of electrically and heat conductive metallic material electrically connected to and bridging the other end of each of said arms as the only member therebetween to complete the circuit for the electric current so that heat is produced at said holder by the current, a portion of said holder being threaded for detachably accepting and holding the solder tip while transferring heat thereto, threaded means on said tip for mating with the threaded means on said holder, at least the threaded portion of said holder formed of a material which does not accept the solder to prevent the tip from being held by solder to the holder.

12. The combination of claim 11 wherein said solder tip holder is formed of aluminum material and said tip including said threaded means is made of a copper material.

13. The combination of claim 11 wherein said solder tip is elongated and has an axial bore therethrough.

14. The combination of claim 11 wherein said tip is solid.

* * * * *